US012738997B2

(12) United States Patent
Chandran et al.

(10) Patent No.: US 12,738,997 B2
(45) Date of Patent: Sep. 15, 2026

(54) METHOD AND SYSTEM FOR DYNAMIC BEAMWIDTH MANAGEMENT IN THE WIRELESS COMMUNICATION SYSTEMS

(71) Applicant: SAMSUNG ELECTRONICS CO., LTD., Suwon-si (KR)

(72) Inventors: Ramesh Chandran, Bangalore (IN); Amarpreet Singh Sethi, New Delhi (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/415,286

(22) Filed: Jan. 17, 2024

(65) Prior Publication Data

US 2024/0154662 A1 May 9, 2024

Related U.S. Application Data

(63) Continuation of application No. PCT/KR2022/010295, filed on Jul. 14, 2022.

(30) Foreign Application Priority Data

Jul. 17, 2021 (IN) ............................ 202141032273

(51) Int. Cl.
*H04B 7/06* (2006.01)

(52) U.S. Cl.
CPC .................................. *H04B 7/0617* (2013.01)

(58) Field of Classification Search
CPC ...... H04B 7/0617; H04B 7/0452; G06N 3/08; G06N 3/04
See application file for complete search history.

(56) References Cited

U.S. PATENT DOCUMENTS 10,342,048 B2 7/2019 Ryoo et al.
11,219,070 B2 1/2022 Park et al.
2006/0009232 A1 1/2006 Vakil et al.
2006/0189355 A1* 8/2006 Cuffaro ................ H04B 7/0695 455/562.1

(Continued)

FOREIGN PATENT DOCUMENTS

CN 103167507 B * 11/2015
CN 108337688 A 7/2018

(Continued)

OTHER PUBLICATIONS

Communication issued on Sep. 11, 2024 from the Intellectual Property India for Indian Patent Application No. 202141032273.

(Continued)

*Primary Examiner* — Edan Orgad
*Assistant Examiner* — Samuel Roberge Bettendorf
(74) *Attorney, Agent, or Firm* — Sughrue Mion, PLLC

(57) ABSTRACT

A method for beamwidth management in a wireless communication system, includes: determining a first set of User Equipments (UEs) served by a beam in a transmission time interval (TTI); comparing a number of UEs in the first set of UEs with a threshold number of UEs that can be served by the beam in the TTI; adjusting a beamwidth of the beam, based on a result of the comparing, to create a second set of UEs served by the beam with the adjusted beamwidth in a subsequent TTI; and forming the beam with the adjusted beamwidth.

14 Claims, 12 Drawing Sheets

(56) References Cited

U.S. PATENT DOCUMENTS

2018/0069309 A1* 3/2018 Friedman ............. H04B 7/0408
2018/0139784 A1 5/2018 Ryoo et al.
2020/0119792 A1 4/2020 Shahsavari et al.
2020/0275493 A1 8/2020 Park et al.
2020/0344776 A1* 10/2020 Sen ....................... H04W 72/12
2021/0084441 A1* 3/2021 Zhou et al. ........... H04W 72/23
2021/0159971 A1 5/2021 Panchal et al.
2021/0184744 A1* 6/2021 Pezeshki ............... H04L 5/0048
2021/0250938 A1* 8/2021 Dai ....................... H04W 16/28
2022/0159480 A1 5/2022 Lu et al.
2023/0239022 A1* 7/2023 Leroux ................ H04B 7/0617
375/267

FOREIGN PATENT DOCUMENTS

CN 110581727 A * 12/2019 ........... H04B 7/0632
CN 108337688 B 4/2020
WO 2017/058286 A1 4/2017
WO WO-2017097045 A1 * 6/2017 ............... H04B 7/04
WO 2019234059 A1 12/2019
WO 2020055408 A1 3/2020
WO 2020/204773 A1 10/2020
WO 2021022479 A1 2/2021

OTHER PUBLICATIONS

Communication issued on Aug. 9, 2023 from the Intellectual Property India for Indian Patent Application No. 202141032273.
International Search Report and Written Opinion (PCT/ISA/220, PCT/ISA/210, and PCT/ISA/237) dated Oct. 25, 2022, issued by International Searching Authority in International Application No. PCT/KR2022/010295.
Communication dated Apr. 25, 2025, issued by European Patent Office in European Patent Application No. 22846145.5.
Communication dated Aug. 21, 2025, issued by the European Patent Office in European Application No. 22846145.5.

* cited by examiner

CSI Beam Combine - Increase Beamwidth

Number of CSI-RS beams reduced from 4 to 2

METHOD AND SYSTEM FOR DYNAMIC BEAMWIDTH MANAGEMENT IN THE WIRELESS COMMUNICATION SYSTEMS

CROSS-REFERENCE TO RELATED APPLICATIONS

This application is a by-pass continuation application of International Application No. PCT/KR2022/010295, filed on Jul. 14, 2022, which is based on and claims priority to Indian Patent Application No. 202141032273, filed on Jul. 17, 2021, in the Indian Intellectual Property Office, the disclosures of which are incorporated by reference herein their entireties.

BACKGROUND

1. Field

The disclosure relates to wireless communication system, and more particularly, to a method and a system for dynamic beamwidth management in the wireless communication system.

2. Description of Related Art

In analog beamforming approach, a single beam per direction per antenna panel is possible in a transmission time interval (TTI). Analog beamforming is simple to implement due to less signal processing complexity at a baseband level. Hence, analog beamforming is adopted in low complexity devices or low power devices like small cell base stations. FIGS. 1A and 1B illustrate beamforming techniques in the related art. As shown in FIG. 1A, a beamwidth is an angle between half power points of a main lobe. The beamwidth and a beam distance coverage may be controlled depending on the number of associated antenna elements in an antenna panel and gNodeB (gNB) power.

As shown in FIG. 1B, multiple user equipment (UE)'s, for example, $UE_1$ and $UE_2$ within a gNB may be served with different beam indexes, (for example, $UE_1$-$B_1$-$\theta_1$, $UE_2$-$B_2$-$\theta_2$.) have same or different beamwidth. For example, Signal Block Beam (SSB) beamwidth may be different from Channel State Information (CSI) beamwidth. As shown in FIG. 1(*b*), beamwidth $\theta_1$>beamwidth $\theta_2$ are of different beamwidth. In general, sharper beams are used to cover UEs in the cell edges. Further, for a given cell radius, a number of UEs covered in wider beam is relatively higher than the sharper beam due to larger span.

FIGS. 2A and 2B illustrate a scheduler operation as in the related art. According to FIG. 2A, a scheduler operation (particularly in a 5G New Radio (NR)) computes priority metric among bearers on slot basis. In particular, the priority metric is computed for each bearer of the connected UEs in each TTI. It is the function of channel quality indicator (CQI), packet delay budget (PDB), modulation and coding scheme (MCS), average throughput (ATP), and buffer occupancy (BO). Each UE is associated with 'K' bearers in a system. $UE^k_n$ is representation of $k^{th}$ bearer of $n^{th}$ UE. The prioritized bearer list is re-organized to determine a prioritized UE list. In each slot, the gNB scheduler tries to find out 'M' highest priority schedulable UEs out of 'N' Connected UEs. At the same time, the gNB scheduler needs to ensure that UEs chosen are served by the same analog beam (in a one beam system). For a given coverage distance, using a wider beamwidth ($\theta_1$) it may be possible to cover more UEs. For example, Beam 1 ($B_1$) covers UE1, UE2 and UE3 and Beam 2 ($B_2$) covers UE 4 and UE 5. Cross scheduling of UEs (across beams) may be not possible in analog beamforming (in a one beam system).

Accordingly, in the 5G scheduler operation, gNB scheduler chooses the UEs with the highest priority metric and the corresponding analogue beam which serves this UE. However, it may be possible that no other UEs or UEs lesser than configured UE/TTI may be scheduled because other UEs in the prioritized list are served by other beams. Since an analog beamforming system is constrained by the number of antenna panels and simultaneous beams, the overall scheduling efficiency will decrease if the UEs served by the chosen beam direction are lesser than configured UE/TTI. In a case of the analog beamforming approach, the overall throughput in a TTI is the sum of the throughputs (TPs) of the UEs covered under the single beam. The above-mentioned constraint may lead to underutilization of available resource block (RBs) in a slot, and thereby, a loss of cell throughput.

For example, as shown in in FIG. 2B, two co-located (or neighboring or adjacent) UEs served by with different Beam Indexes B1 and B2 may have same beamwidth values having instantaneous requirement of 50% of all available RBs. Due to analog beamforming approach, it may be not possible to schedule both the UEs in a single TTI. The above situation will lead to reduction in cell TP significantly. Further, a phase of the signal is adjusted for the antenna panel in the radio frequency (RF) domain.

Thus, there is a need to define, develop, or implement a new methodology to dynamically adjust the beamwidth of a gNB CSI beam. Thus, there exists a need to overcome at least one of the aforementioned problems.

SUMMARY

Aspects of the disclosure are to address at least the above-mentioned problems and/or disadvantages and to provide at least the advantages described below.

Provided are a method and a system for predicting and optimizing resource utilization of AI applications in an embedded computing system.

According to an aspect of the disclosure, a method for beamwidth management in a wireless communication system, includes: determining a first set of User Equipments (UEs) served by a beam in a transmission time interval (TTI); comparing a number of UEs in the first set of UEs with a threshold number of UEs that can be served by the beam in the TTI; adjusting a beamwidth of the beam, based on a result of the comparing, to create a second set of UEs served by the beam with the adjusted beamwidth in a subsequent TTI; and forming the beam with the adjusted beamwidth.

The second set of UEs may be created based on the adjustment in the beamwidth, and a number of UEs in the second set of UEs may be different from the number of UEs in the first set of UEs.

The adjusting the beamwidth of the beam may include: increasing the beamwidth based on determining that the number of UEs in the first set is less than the threshold number of UEs; and decreasing the beamwidth based on determining that the number of UEs in the first set is greater than the threshold number of UEs.

The increasing the beamwidth may include combining the beam with at least one neighboring beam.

The decreasing the beamwidth may include splitting a previously combined beam into at least two sub-beams.

The method may further include: determining the number of UEs in the first set to be less than the threshold number of UEs based on the result of the comparing; combining at least two beams to form a combined beam; and including at least one additional UE that is serviceable by the combined beam, in the first set of UEs to form the second set of UEs.

The method may further include: receiving a scheduler output that comprises a prioritized scheduling list of UEs that are schedulable in the combined beam; and selecting at least one UE from the UEs, based on a scheduling priority of the at least one UE, and adding the at least one UE to the second set of UEs.

The method may further includes: determining the number of UEs in the first set is greater than the threshold number of UEs based on the comparing; splitting a beam into at least two beams; and splitting a set of UEs served by the previously combined beam into as many sets as a number of split beams such that the number of UEs in any of the split sets is less than the number of UEs in the previously combined beam.

According to an aspect of the disclosure, an apparatus for beamwidth management in a wireless communication system, includes: a communication unit; a memory unit; and at least one processor operatively connected to the communication unit and the memory unit, the at least one processor being configured to: determine a first set of User Equipments (UEs) served by a beam in a transmission time interval (TTI); compare a number of UEs in the first set of UEs with a threshold number of UEs that can be served by the beam in the TTI; adjust a beamwidth of the beam, based on a result of the comparison, to create a second set of UEs served by the beam with the adjusted beamwidth in a subsequent TTI; and form the beam with the adjusted beamwidth.

The second set of UEs may be created based on the adjustment in the beamwidth, and a number of UEs in the second set of UEs may be different from the number of UEs in the first set of UEs.

The at least one processor may be further configured to: increase the beamwidth based on a determination that the number of UEs in the first set is less than the threshold number of UEs; and decrease the beamwidth based on a determination that the number of UEs in the first set is greater than the threshold number of UEs.

The at least one processor may be further configured to: determine the number of UEs in the first set to be less than the threshold number of UEs based on the outcome; combine at least two beams to form a combined beam; and comprise at least one additional UE that is serviceable by the combined beam in the first set of UEs to establish the second set of UEs.

The at least one processor may be further configured to: receive a scheduler output that comprises a prioritized scheduling list of UEs that are schedulable in the combined beam; and select at least one UE from the UEs, based on a scheduling priority of the at least one UE, and add the at least one UE to the second set of UEs.

The at least one processor may be further configured to: determine the number of UEs in the first set to be greater than the threshold number of UEs based on the outcome; split a beam into at least two beams; and split a set of UEs served by a previously combined beam into as many sets as a number of split beams such that the number of UEs in any of the split sets is lesser than the number of UEs in the previously combined beam.

The method may further include: providing a plurality of parameters as an input to an Artificial Intelligence (AI) module; obtaining a beamwidth adjustment value based on the plurality of the parameters; and adjusting the beamwidth of the beam, based on the obtained beamwidth adjustment value, such that the second set of UEs is served by the beam with the adjusted beamwidth in a subsequent TTI interval. The plurality of the parameters may include at least one of a scheduling pattern, a number of serviceable UEs, and an effective throughput of each UE in the number of UEs.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
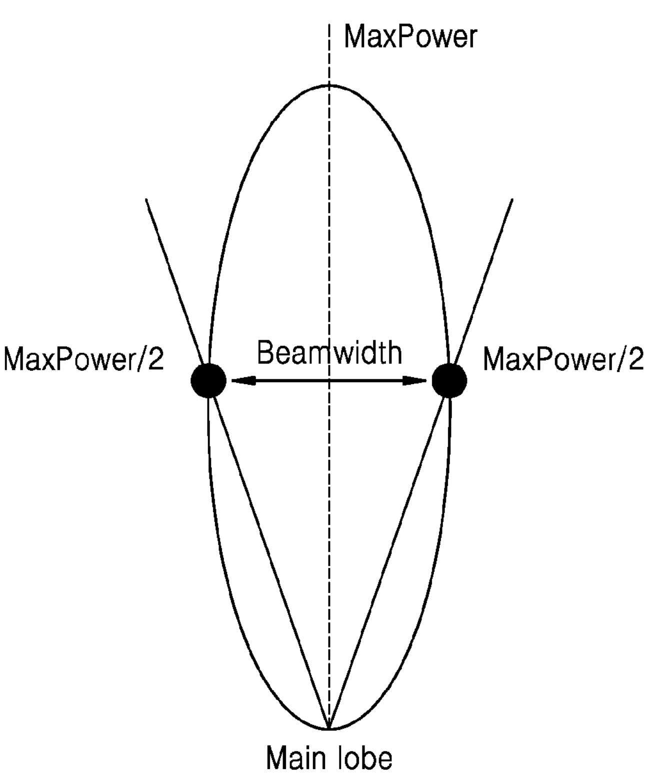
FIGS. 1A and 1B illustrate beamforming techniques in the related art.
Figure 1B:
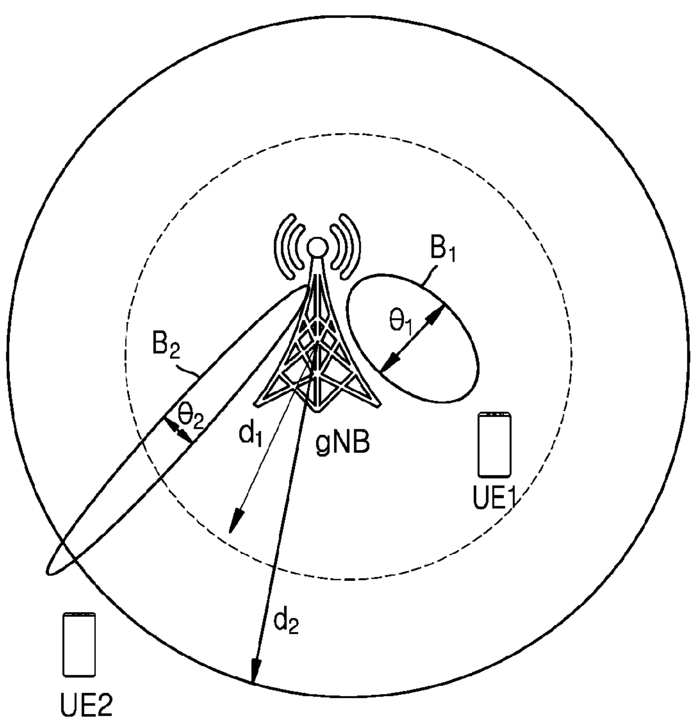
Figure 2A:
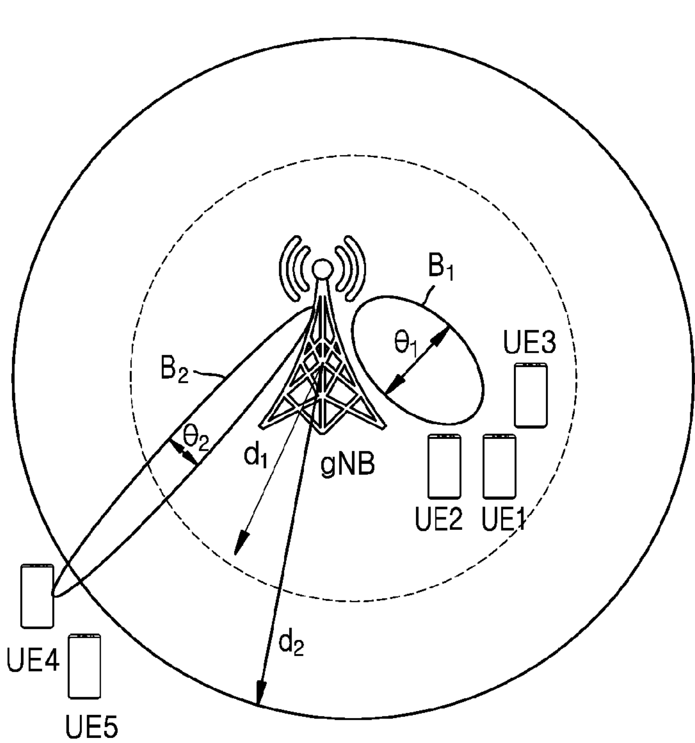
FIGS. 2A and 2B illustrate a scheduler operation in the related art.
Figure 2B:
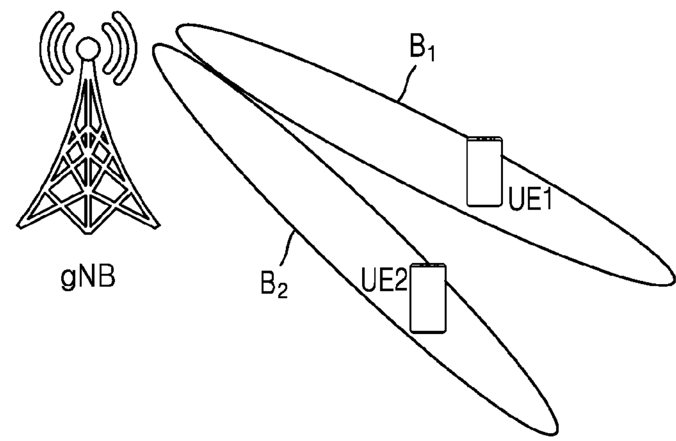

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", "includes", "including" or any other variations thereof, are intended to cover a non-exclusive inclusion, such that a process or method that comprises a list of steps or operations does not include only those steps or operations but may include other steps or operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Figure 3:
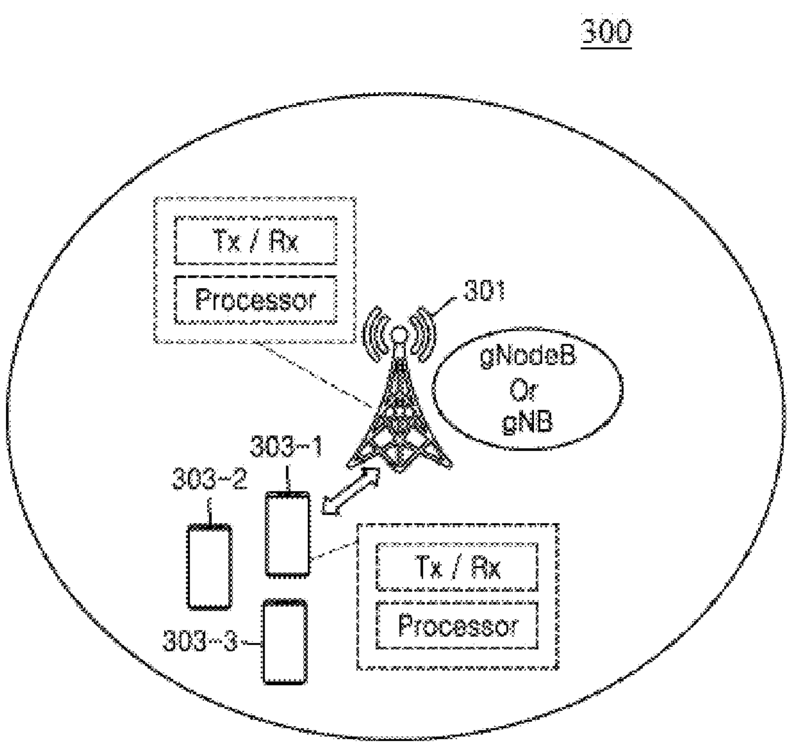
FIG. 3 illustrates an example of a wireless system architecture for dynamic beamwidth management, according to an embodiment of the disclosure.

The disclosure relates to wireless communication system and more particularly relates to a method and system for dynamic beamwidth management in wireless communication system. FIG. 3 illustrates an example of a wireless system architecture for dynamic beamwidth management, according to an embodiment of the disclosure. The wireless system architecture 300 may be implemented in accordance with one or more wireless standards, such as 4G, 5G, 5G NR, 6G and/or advanced standards and without deviating the scope of the disclosure. For the sake of explanation, the wireless system architecture 300 implemented with the 5G NR system is considered. In one embodiment, a User Equipment (UE) 303-1, 303-2, 303-3 is served by a network node 301.

In one embodiment, the network node may be gNB as defined in the 4G or 5G standards. Further, operation of the network node may be performed by, for example, but not limited to, the cloud-RAN (C-RAN), a central unit (CU), a core network (NW), a distributed unit (DU) or any other possible network (NW) entity and performs the functionalities of the network node as defined in 4G, 5G, 6G and/or advanced specifications and without deviating the scope of the disclosure.

Figure 4:
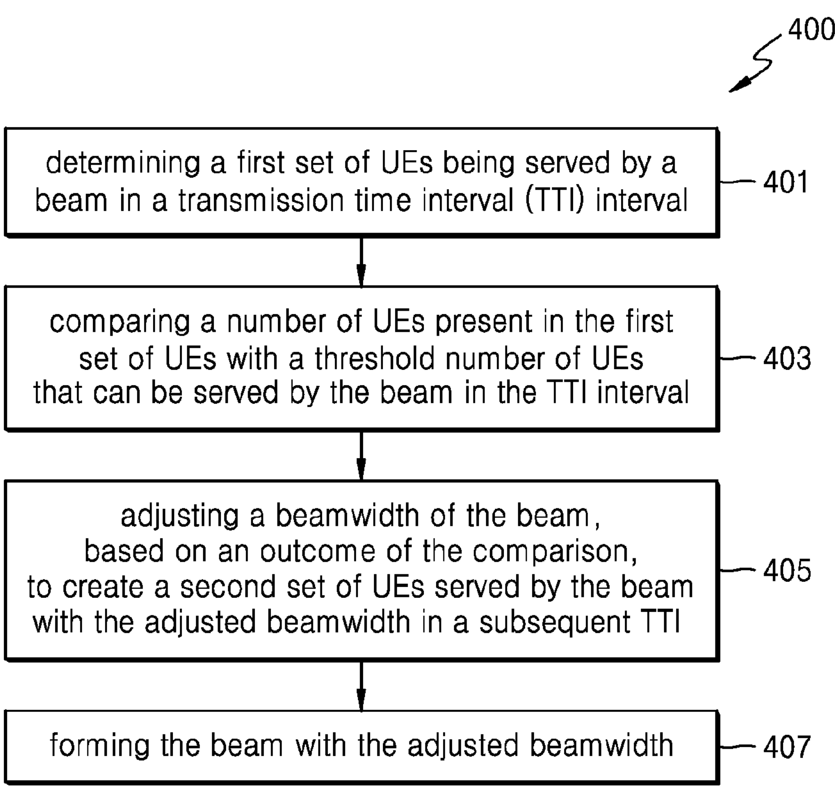
FIG. 4 illustrates a flow diagram for beamwidth management, in a wireless communication system, in accordance with an embodiment of the disclosure.

FIG. 4 illustrates a flow diagram for beamwidth management in a wireless communication system, in accordance with an embodiment of the disclosure. Referring to the FIG. 4, a method 400 may be implemented in a network node 301 in the wireless system architecture 300 as shown in FIG. 3. Explanation will be made herein with respect to FIGS. 3 and 4 together. In an embodiment, the network node 301 may perform the method 400.

Figure 5:
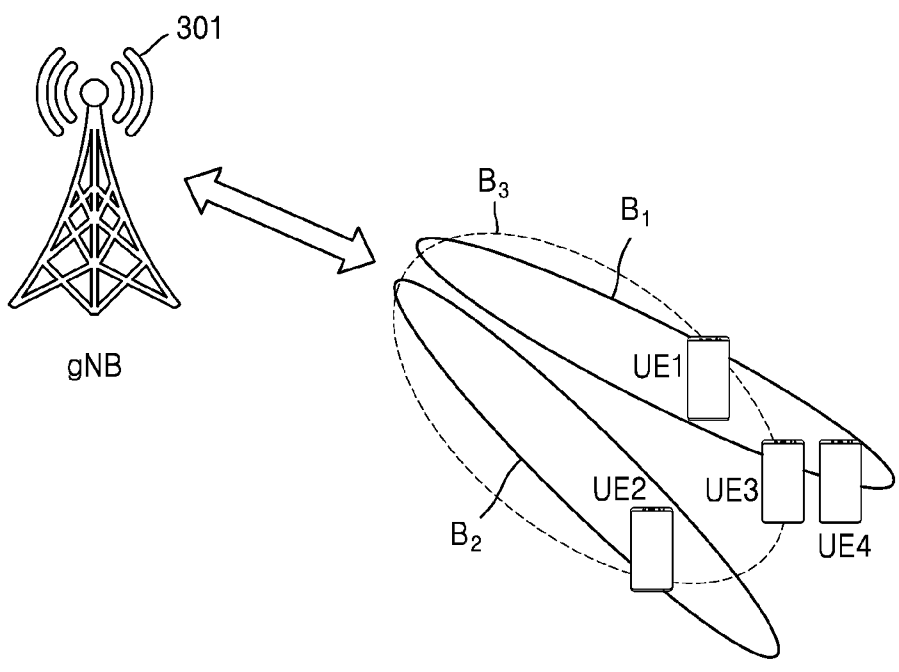
FIGS. 5, 6A and 6B illustrate an example scenario for beam adjustment, in accordance with an embodiment of the disclosure.

At operation 401, the method 400 comprises, determining a first set of UEs that is served by a beam in a transmission time interval (TTI) interval. An exemplary scenario is shown in FIG. 5, where UE1, UE3, UE4 are served by beam B1 and UE2 is served by the beam B2. Thus, according to the embodiment, the first set of UE s that is served by the beam B1 in a TTI interval may be UE1, UE3, and UE4.

Thereafter, at operation 403, the network node 301 compares a number of UEs present in the first set of UEs with a threshold number of UEs that may be served by the beam in the TTI interval. The threshold number of UEs (that may be served by the beam in the TTI interval) may be decided at the network side. In one embodiment, the threshold number of UEs (that may be served by the beam in the TTI interval) may corresponds to a number of schedulable UEs/TTI.

Based on a result of comparison, at operation 405, the beamwidth is adjusted to create a second set of UEs, which is served by the beam with the adjusted beamwidth, in a subsequent TTI interval(s). Thus, the second set of the UEs is created based on the adjustment in the beamwidth. In one embodiment, a number of UEs in the second set of UEs may be different from the number of UEs in the first set of UEs. For example, in the second set of UEs the number of UEs may be more or less that first set of UEs.

In an embodiment, the beamwidth may be dynamically adjusted based on at least one of a scheduling pattern of the UE, a number of connected UEs with a beam in gNB the number of schedulable UEs/TTI, a number of serving UE in a particular beam, an effective throughput value of serving UEs, a threshold for beamwidth change, a beamwidth metric in a TTI for a particular beam, a beamwidth adjustment threshold for increasing/decreasing beamwidth, a beamwidth metric adjustment factor in each TTI, or a filter co-coefficient.

Figure 6A:
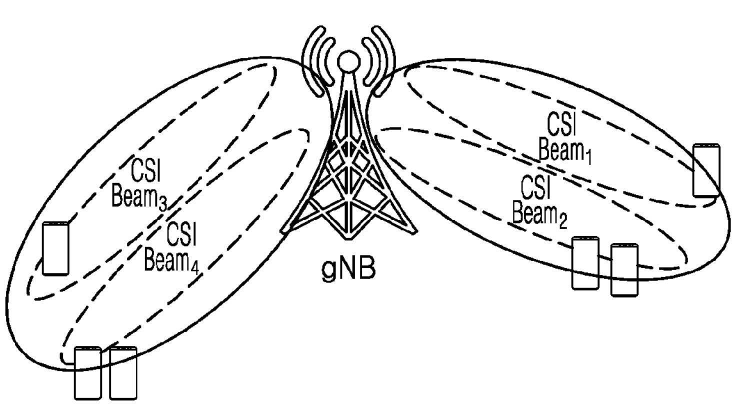
Figure 6B:
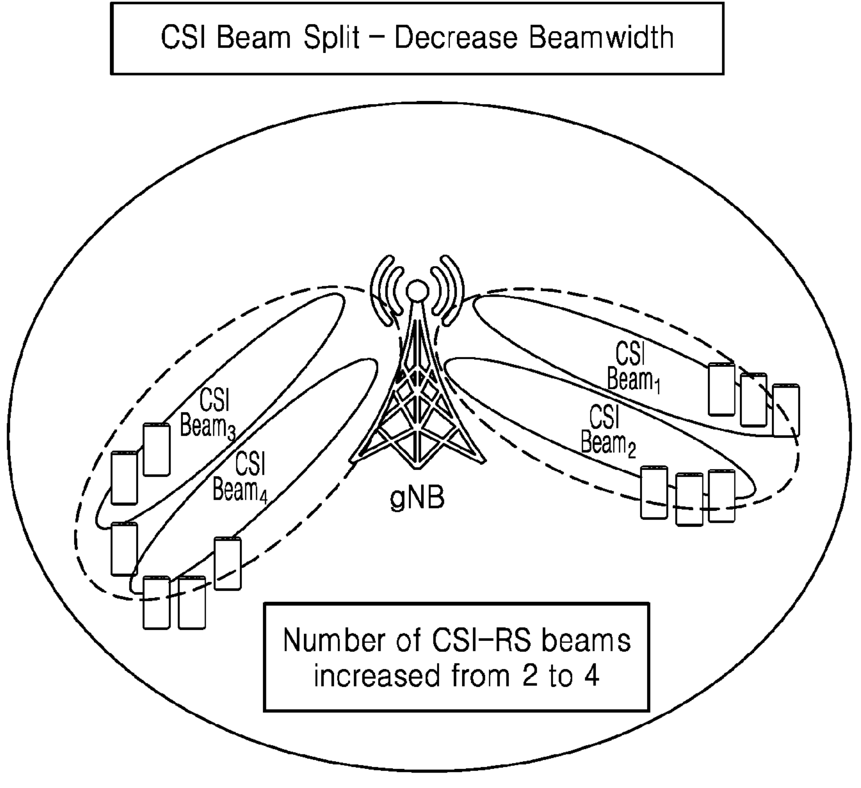

In an embodiment, the adjustment of the beamwidth of the beam at operation 405 may include increasing the beamwidth based on a determination that the number of UEs in the first set is less than the threshold number of UEs and/or decreasing the beamwidth based on a determination that the number of UEs in the first set is greater than the threshold number of UEs. A further exemplary scenario of beam adjustment is illustrated in FIGS. 6A and 6B. In an embodiment, the increasing of the beamwidth may include combining the beam with at least one neighboring beam as shown in FIG. 6A and decreasing of the beamwidth by splitting the beam as shown in FIG. 6B. Subsequently, at operation 407, the network node 301 forms the beam with the adjusted beamwidth. As an exemplary scenario shown in FIG. 5, the beams B1 and B2 may be adjusted (or combined) to become a single beam B3. Therefore, the second set UEs may include UE1, UE2, UE3, and UE4.

According to embodiment of the disclosure, the method 400 may comprise determining whether the number of UEs in the first set is less than the threshold number of UEs based on the outcome of the comparison. If it is determined that the number of UEs in the first set is less than the threshold number of UEs, at least two beams may be combined to become a combined beam. Thus, as shown in FIG. 6(*a*), CSI beam 3 and CSI beam 4 may be combined to become CSI beam B. Similarly, CSI beam 1 and CSI beam 2 may be combined to become CSI beam A. Thus, a number of channel state information reference signal (CSI-RS) beams may be reduced from 4 to 2. The combined beam may be defined as beamwidth widening. Thereafter, the method 400 may comprise an operation of including at least one additional UE that is serviceable by the combined beam, in the first set of UEs to form the second set of UEs. The inclusion of the at least one additional UE that is serviceable may be performed to accommodate the at least one additional UE as the threshold number of UEs are determined as less and the formed beam can accommodate a greater number of serviceable UEs for serving.

Further, for the operation of including the at least one additional UE, the method 400 may include an operation of receiving a scheduler output including a prioritized scheduling list of one or more of UEs that are schedulable in the combined beam. In an embodiment, the prioritized scheduling list of one or more of UEs that are schedulable may be received from an output of MAC (Medium Access Control layer) scheduler from each TTI. Thereafter, at least one UE may be selected based on its respective scheduling priority to form the second set of UEs. Thus, a beamwidth of the gNB may be adjusted dynamically by combining multiple users to cover under the same beamwidth as per scheduler pattern. Hence, cell TP is improved by serving more number of users in a TTI having wider beamwidth as compared to scheduling multiple users in different TTIs having sharper beamwidth.

According to embodiment of the disclosure, the method 400 further includes determining whether the number of UEs in the first set is greater than the threshold number of UEs based on the outcome of the comparison. If it is determined that the number of UEs in the first set is greater than the threshold number of UEs, then a beam may be split into at least two beams. Thereby, the set of UEs served by the previously combined beam may be split into as many sets as number of split beams such that the number of UEs included in any of the split sets is lesser than the number of UEs in the previously combined beam. In an embodiment, as shown in FIG. 6, a previously combined beam (i.e., CSI beam A) may be split into CSI beam 3 and CSI beam 4. Similarly, a previously combined beam (i.e., CSI beam B) may be split into CSI beam 1 and CSI beam 2. Thus, the number of CSI-RS beams may be increased from 2 to 4. The combined beam may be defined as 'beamwidth splitting.'

According to further embodiment of the disclosure, a rule-based approach is proposed to dynamically adjust the beamwidth. The following Table 1 discloses the rule-based approach for performing the method 400 as disclosed in FIG. 4. All the operations performed by the method 400 may be similar to the operations explained in Table 1. The mechanism to for performing the method 400 is shown below:

TABLE 1

Key Input Parameters

N - Number of Connected UEs in a gNB
M - Number of Schedulable UEs/TTI
L - Threshold for beamwidth change
$R_k$ - Number of UEs under serving beam 'k'
$BM^k_i$ - Beamwidth metric in a TTI 'I' for a beam 'k'
$BM_{LowTh}$ - Beamwidth adjustment threshold for increasing beamwidth
$BM_{HighTh}$ - Beamwidth adjustment threshold for decreasing beamwidth
δ - Beamwidth metric adjustment factor in each TTI
γ - Filter co-efficient Rule based approach for beamwidth adjustment

```
if R_k > M + L
   BM^k_i = γ * BM^k_i + (1− γ) * δ ; //Beamwidth metric adjustment
   if BM^k_i > BM_HighTh
      Decrease Beamwidth of serving CSI beam i ; //adjust to sharper beam
      Select M best UEs in a beam 'k';
   else
      Select M best UEs in a beam 'k';
   end
else if R_k < M − L
BM^k_i = γ * BM^k_i − (1− γ) * δ ; //Beamwidth metric adjustment
   if BM^k_i < BM_LowTh
```

TABLE 1-continued

```
      Increase Beamwidth of serving CSI beam i ; //adjust to wider beam
      Schedule best UEs within R_k;
   else
      Schedule possible UEs < R_k;
   end
end
```

Thus, in Table 1, the beamwidth metric may be adjusted in each TTI. Further, the beamwidth adjustment threshold (L) may be defined to control the frequent change of the beamwidth direction. For example, the L, as one of the parameters, may be used along with the parameter "Number of schedulable UEs/TTI" (M) to determine the need for beamwidth combining or splitting. The L may be defined at the network end by the network operator. The choice of the parameter L may help in determining the most optimum number of beams necessary to schedule UEs in accordance to or based on their requirements of Quality-of-Service (QoS). Thus, the available gNB capability may be utilized in terms of a number of UEs that may be served per TTI, thereby system performances (such as resource utilization, system throughput) may be improved. Further, according to another aspect of the disclosure, the parameter L may be manually configured or dynamically tuned by using a neural network (NN) which will be described in detail with respect to FIGS. 8A and 8B.

Figure 7:
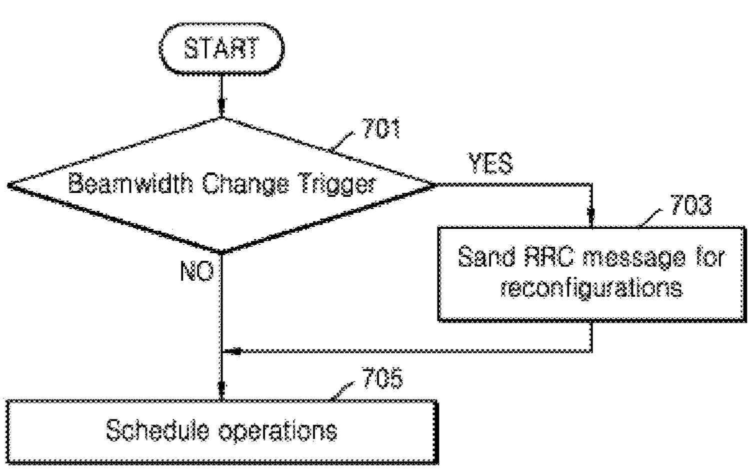
FIG. 7 illustrates a flow of a trigger mechanism to adjust the beamwidth of gNB CSI beam, in accordance with an embodiment of the disclosure.
Figure 8A:
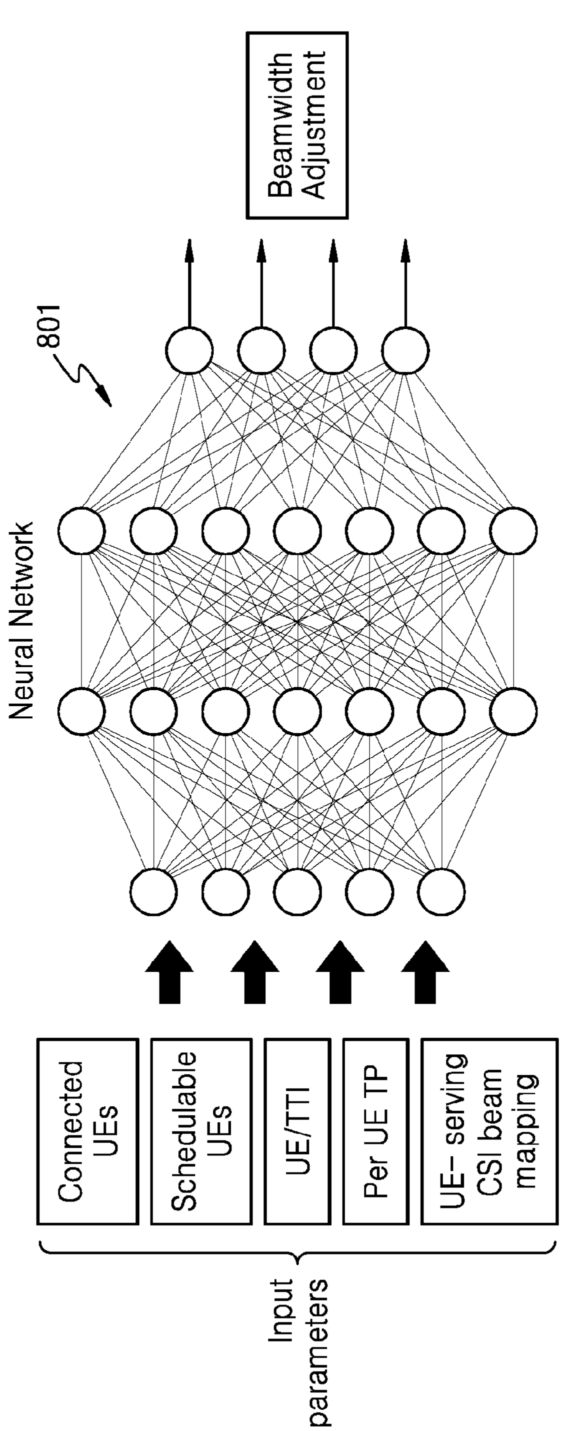
FIGS. 8A and 8B illustrate a neural network (NN)/artificial intelligence (AI)/machine learning (ML) module in the network node to predict the beamwidth adjustment, according to an embodiment of the disclosure.
Figure 8B:
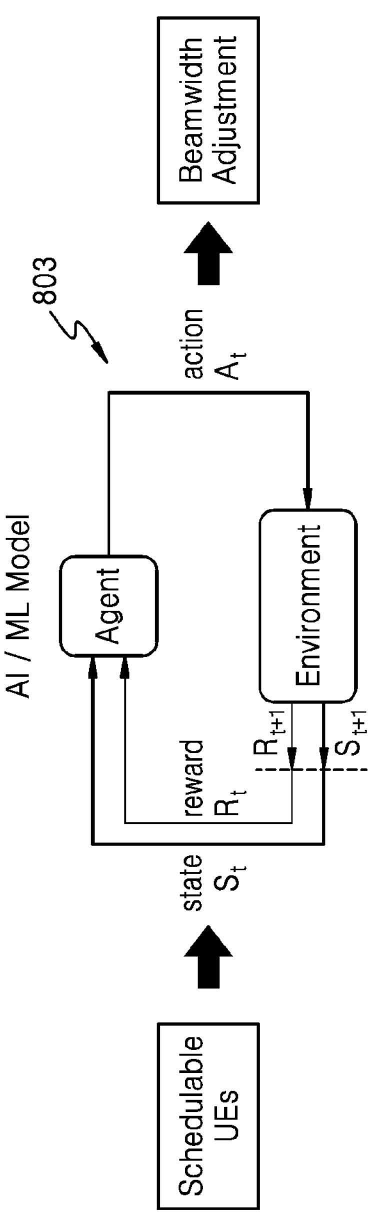

According to an embodiment of the disclosure, the beamwidth may be adjusted in a periodic or aperiodic or in a trigger based manner. FIG. 7 illustrates a flow of a trigger mechanism to adjust the beamwidth of gNB CSI beam, in accordance with an embodiment of the disclosure. Explanation will be made with respect to FIG. 4. After operation 403 (as described in FIG. 4) is performed, at operation 701 of method 700, it may be determined whether a beamwidth change trigger is generated. If it is determined that the beamwidth change trigger is generated, then an RRC message may be sent for a reconfiguration of UEs to form or establish the second set of UEs (as disclosed in operation 405) that may be served by the beam with the adjusted beamwidth in later TTI interval(s). Alternatively, if, at operation 701, it is determined that beamwidth change trigger FIGS. 8A and 8B illustrate an NN model 801 and an artificial intelligence (AI)/machine learning (ML) model 803 in the network node to predict the beamwidth adjustment, according to an embodiment of the disclosure. Accordingly, the NN model 801 or the AI/ML model 803 may be provided with the a one or more parameters as an input. In one embodiment, the input parameters may include at least one of the scheduling pattern, the number of connected UEs in the gNB, the number of schedulable UEs/TTI, the effective throughput of the serving UE, UE serving beam mapping and the like. Thereafter, a beamwidth adjustment value may be obtained based on the plurality of the parameter. In particular, for the NN model 801, the NN model may read the parameters and store the past output from its memory. Based on these input parameters, trained weights may be computed and NN may generate output action. In this case, the NN model may predict the beamwidth to increase the cell throughput. Similarly, for the AI model 803, the AI model 803 based system may read the parameters and store the past output from its memory. Based on these input parameters, trained weights may be computed, and AI systems may generate output action. In this case, AI/ML system may predict the beamwidth to increase the cell throughput. Thus, after obtaining the beamwidth adjustment value, adjusting the beamwidth of the beam may be performed, based on the obtained beamwidth adjustment value, such that the second set of UEs may be served by the beam with the adjusted beamwidth in further TTI interval(s).

Thus, based on the present methodology, the beamwidth per scheduler parameters may be effectively adjusted. Thereby, it may be helpful for increasing/decreasing of beamwidth in order to increase the cell throughput.

Figure 9:
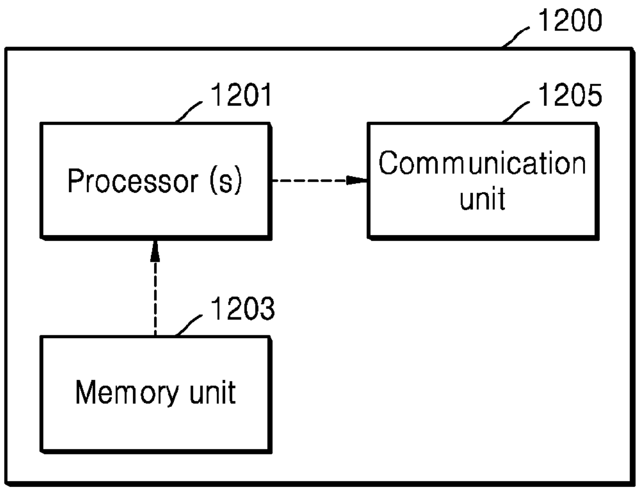
FIG. 9 illustrates another exemplary diagram of a network node, according to an embodiment of the disclosure.

FIG. 9 illustrates another exemplary diagram of a network node, according to an embodiment of the disclosure. The network node 1200 may include a communication unit 1205 (e.g., communicator or communication interface), a memory unit 1203 (e.g., storage), and at least one processor 1201. Further, the network node 1200 may also include Mobility Management Entity (MME), Evolved Universal Mobile Telecommunications Service (UMTS) Terrestrial Radio Access Network (EUTRAN), Base Transceiver Station (BTS), Cloud-RAN (C-RAN), a Central Unit (CU), a core Network (NW), a Distributed unit (DU) or the any other possible network (NW) entity. The various examples of the network node are explained above therefore omitted here for the sake of brevity. The communication unit 1205 may perform functions for transmitting and receiving signals via a wireless channel.

In an example, the at least one processor 1201 may be a single processing unit or a number of units, all of which could include multiple computing units. The at least one processor 1201 may be implemented as one or more microprocessors, microcomputers, microcontrollers, digital signal processors, central processing units, state machines, logic circuitries, and/or any devices that manipulate signals based on operational instructions. Among other capabilities, the at least one processor 1201 is configured to fetch and execute computer-readable instructions and data stored in the memory. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or AI model stored in the non-volatile memory and the volatile memory. The predefined operating rule or AI model is provided through training or learning.

The memory may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

At least one of the plurality of modules may be implemented through an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or AI model stored in the non-volatile memory and the volatile memory. The predefined operating rule or AI model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may include a plurality of NN layers. Each layer has a plurality of weight values, and performs a layer operation through calculation of a previous layer and an operation of a plurality of weights. Examples of the NN include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Figure 10:
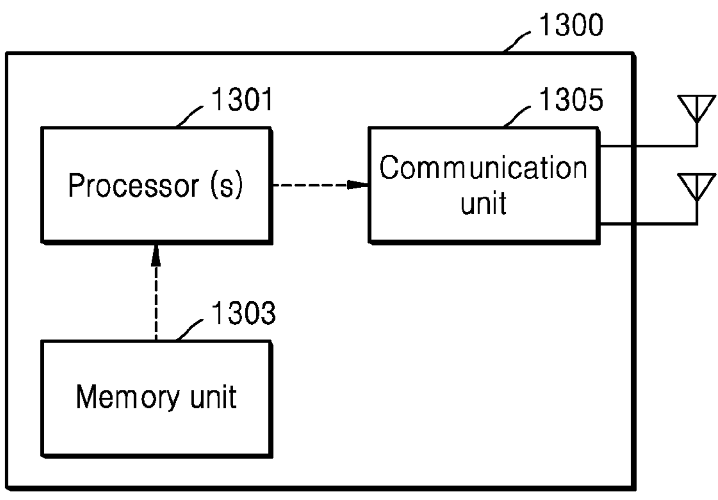
FIG. 10 is a diagram illustrating the configuration of a terminal 1300 in a wireless communication system according to an embodiment of the disclosure.

FIG. 10 is a diagram illustrating the configuration of a terminal 1300 in a wireless communication system according to an embodiment of the disclosure. The configuration of FIG. 10 may be understood as a part of the configuration of the terminal 1300. Hereinafter, it is understood that terms including "unit" or "er" at the end may refer to the unit for processing at least one function or operation and may be implemented in hardware, software, or a combination of hardware and software.

Referring to FIG. 10, the terminal 1300 may include a communication unit 1305 (e.g., communicator or communication interface), a memory unit 1303 (e.g., storage), and at least one processor 1301. By way of example, the terminal 1300 may be a User Equipment, such as a cellular phone or other device that communicates over a plurality of cellular networks (such as a 4G, a 5G or pre-5G network or any future wireless communication network).

The communication unit 1305 may perform functions for transmitting and receiving signals via a wireless channel.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for beamwidth management in a wireless communication system, the method comprising:

determining a first set of user equipments (UEs) served by a beam of a network node in a transmission time interval (TTI);

comparing a first number of UEs in the first set of UEs with a threshold number of UEs that can be served by the beam of the network node in the TTI, wherein the threshold number of UEs is determined at the network node and corresponds to a number of schedulable UEs per TTI;

adjusting a beamwidth of the beam, based on a result of the comparing, to create a second set of UEs served by the beam with the adjusted beamwidth in a subsequent TTI; and forming the beam with the adjusted beamwidth, wherein the adjusting of the beamwidth of the beam based on the result of the comparing comprises increasing the beamwidth of the beam by combining the beam with at least one neighboring beam based on determining that the first number of UEs in the first set of UEs is less than the threshold number of UEs.

2. The method of claim 1, wherein the second set of UEs is created based on the adjusted beamwidth, and wherein a second number of UEs in the second set of UEs is different from the first number of UEs in the first set of UEs.

3. The method of claim 1, wherein the adjusting of the beamwidth of the beam based on the result of the comparing further comprises decreasing the beamwidth based on determining that the first number of UEs in the first set of UEs is greater than the threshold number of UEs.

4. The method of claim 3, wherein the decreasing of the beamwidth comprises splitting the beam into at least two split beams.

5. The method of claim 4, further comprising:

splitting the first set of UEs served by the beam into as many sets as a number of split beams based on determining that the first number of UEs in the first set of UEs is greater than the threshold number of UEs.

6. The method of claim 1, further comprising:

including at least one UE that is serviceable by the combined beam, in the first set of UEs to form the second set of UEs, based on determining that the first number of UEs in the first set of UEs is less than the threshold number of UEs.

7. The method of claim 6, further comprising:

receiving a scheduler output that comprises a prioritized scheduling list of UEs that are schedulable in the combined beam; and selecting the at least one UE from among the UEs that are schedulable in the combined beam, based on a scheduling priority of the at least one UE.

8. The method of the claim 1, further comprising:

providing a plurality of parameters as an input to an Artificial Intelligence (AI) module;

obtaining a beamwidth adjustment value based on the plurality of parameters; and adjusting the beamwidth of the beam, based on the obtained beamwidth adjustment value, such that the second set of UEs can be served by the beam with the adjusted beamwidth in a subsequent TTI interval, wherein the plurality of parameters comprises at least one of a scheduling pattern, a number of serviceable UEs, and a throughput of each UE in the first set of UEs.

9. An apparatus for beamwidth management in a wireless communication system, the apparatus comprising:

at least one processor configured to:

determine a first set of user equipments (UEs) served by a beam of the apparatus in a transmission time interval (TTI), wherein the apparatus is a network node;

compare a first number of UEs in the first set of UEs with a threshold number of UEs that can be served by the beam of the apparatus in the TTI, wherein the threshold number of UEs is determined at the network node and corresponds to a number of schedulable UEs per TTI;

adjust a beamwidth of the beam, based on a result of the comparison, to create a second set of UEs served by the beam with the adjusted beamwidth in a subsequent TTI; and form the beam with the adjusted beamwidth, wherein the at least one processor is further configured to increase the beamwidth of the beam by combining the beam with at least one neighboring beam based on determining that the first number of UEs in the first set of UEs is less than the threshold number of UEs.

10. The apparatus of claim 9, wherein the second set of UEs is created based on the adjusted beamwidth, and wherein a second number of UEs in the second set of UEs is different from the first number of UEs in the first set of UEs.

11. The apparatus of claim 9, wherein the at least one processor is further configured to decrease the beamwidth based on determining that the first number of UEs in the first set of UEs is greater than the threshold number of UEs.

12. The apparatus of claim 11, wherein the at least one processor is further configured to:

split the beam into at least two split beams based on determining that the first number of UEs in the first set of UEs is greater than the threshold number of UEs; and split the first set of the UEs served by the beam into as many sets as a number of split beams based on determining that the first number of UEs in the first set of UEs is greater than the threshold number of UEs.

13. The apparatus of claim 9, wherein the at least one processor is further configured to include at least one UE that is serviceable by the combined beam in the first set of UEs, to form the second set of UEs, based on determining that the first number of UEs in the first set of UEs is less than the threshold number of UEs.

14. The apparatus of claim 13, wherein the at least one processor is further configured to:

receive a scheduler output that comprises a prioritized scheduling list of UEs that are schedulable in the combined beam; and select the at least one UE from among the UEs that are schedulable in the combined beam, based on a scheduling priority of the at least one UE.

* * * * *